March 26, 1935.  A. H. ADAMS ET AL  1,995,595
TABULATING AND LISTING MACHINE
Filed Aug. 20, 1929   9 Sheets-Sheet 2
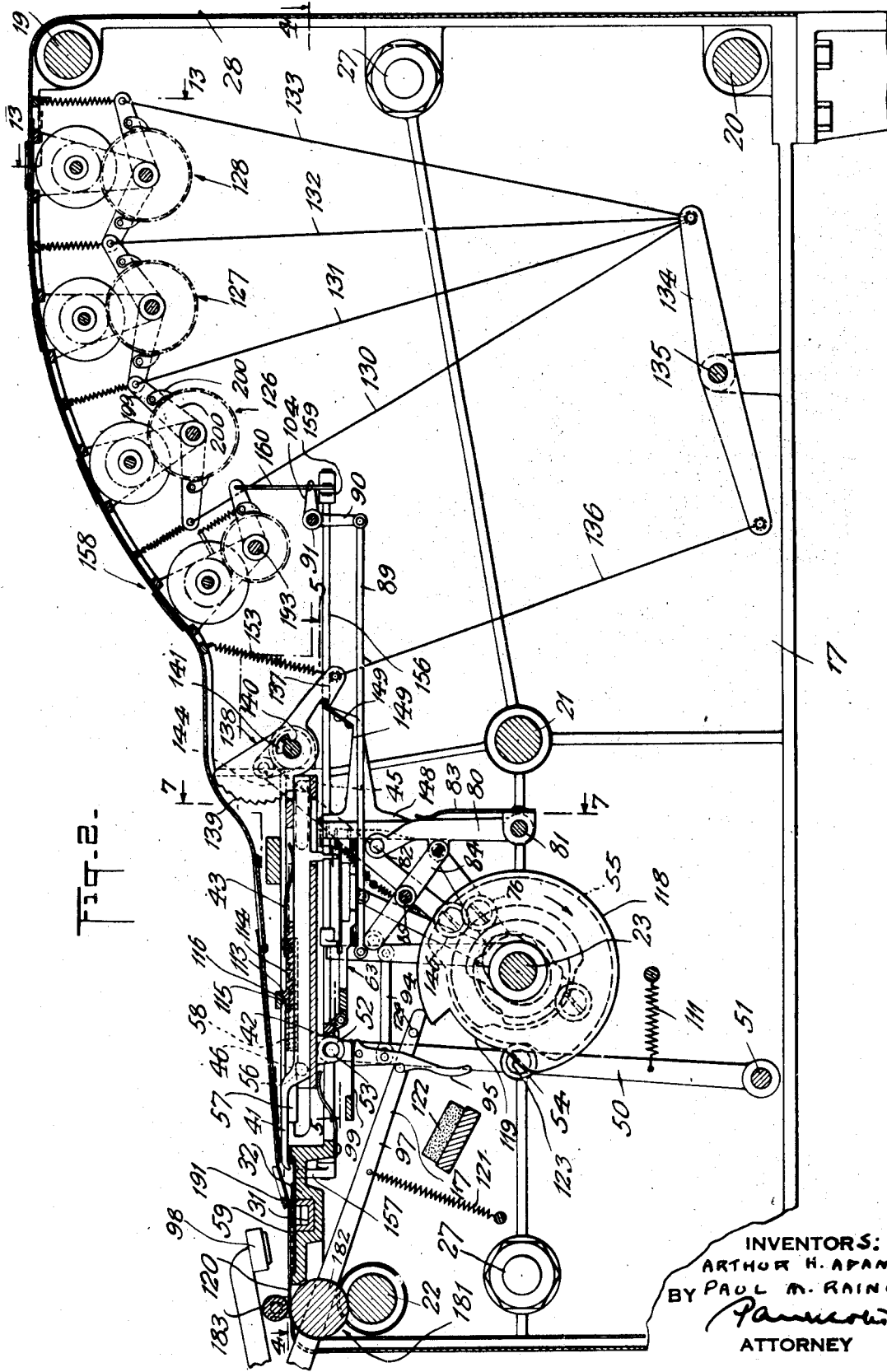
INVENTORS:
ARTHUR H. ADAMS
PAUL M. RAINEY
BY
ATTORNEY

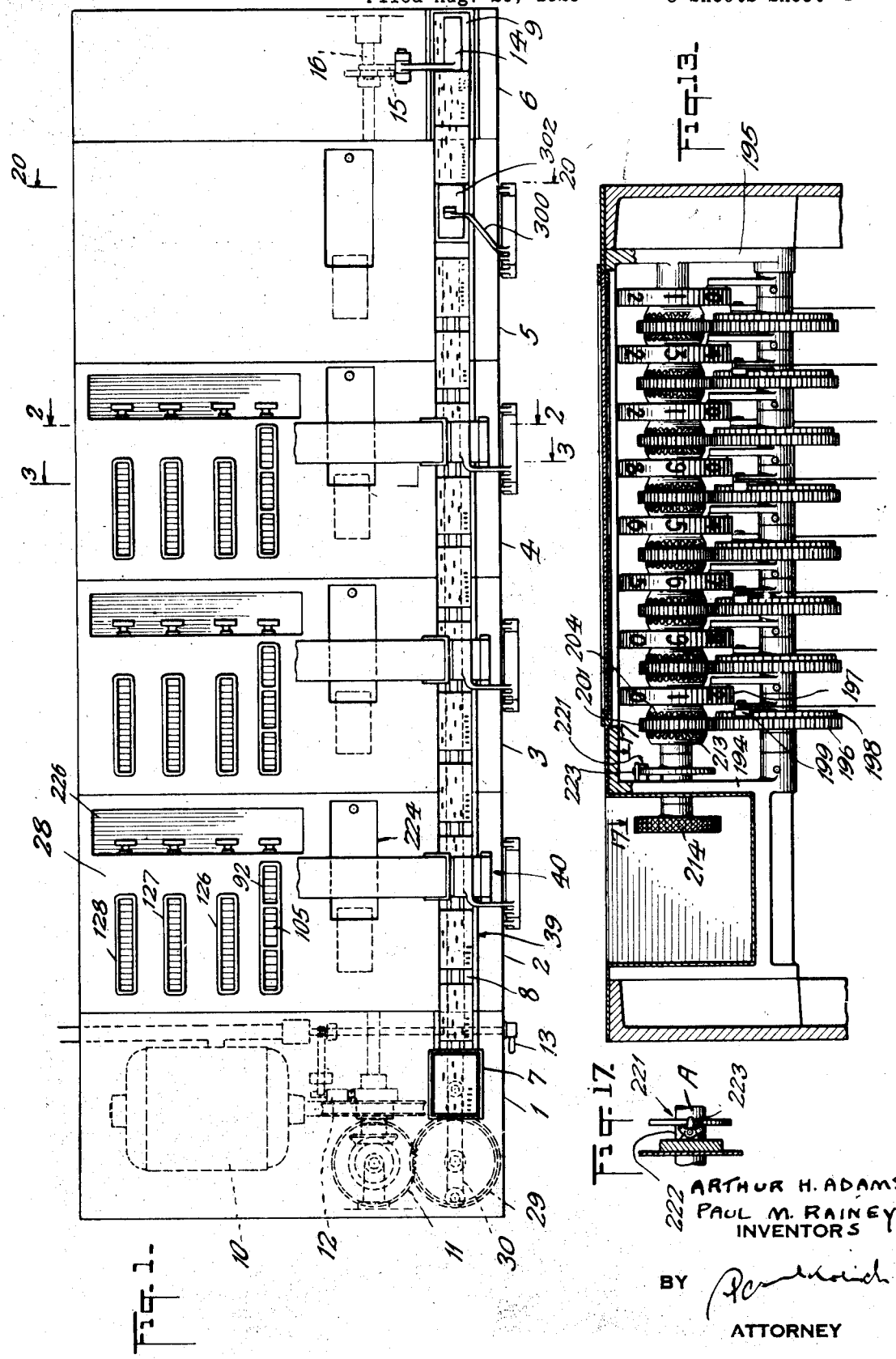

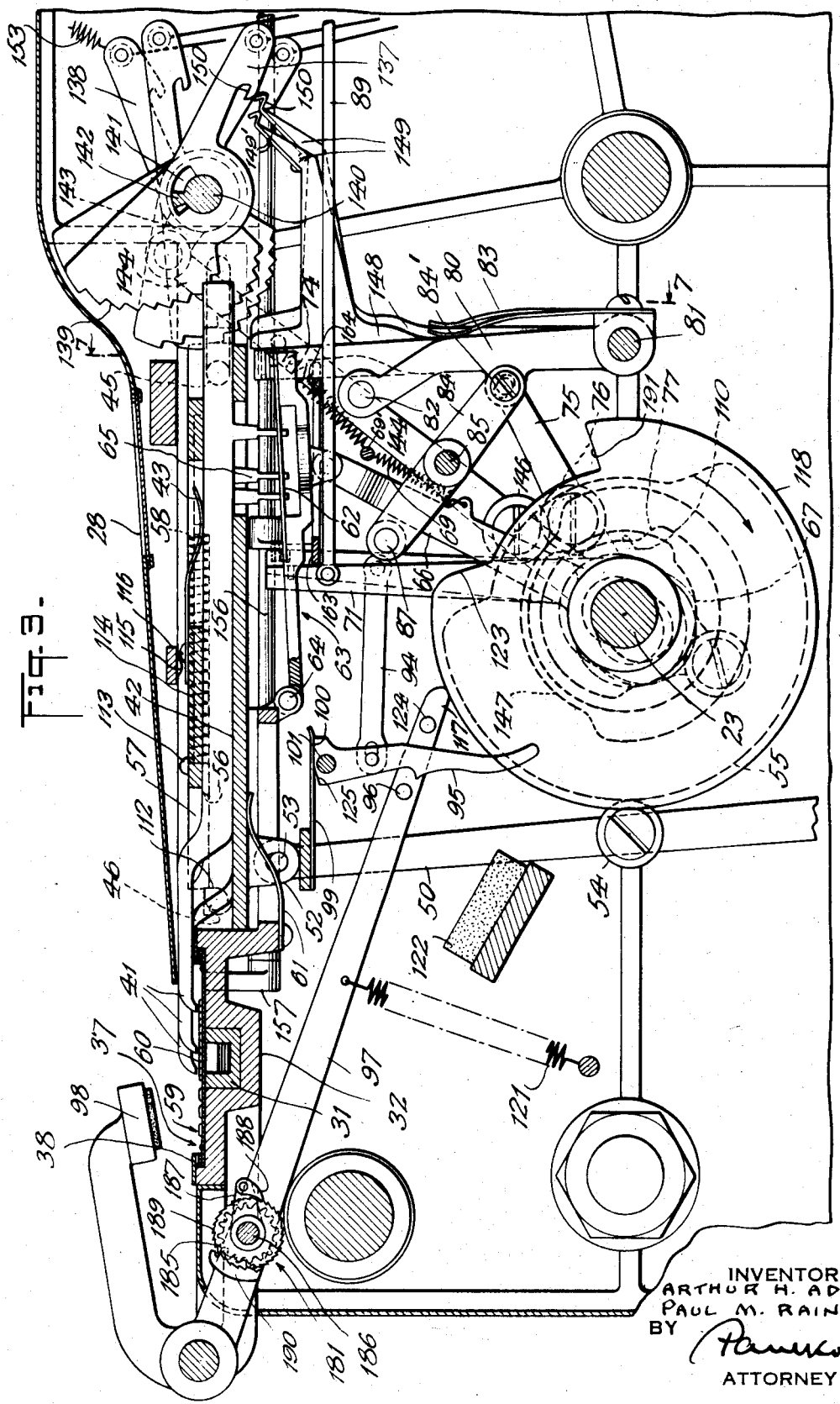

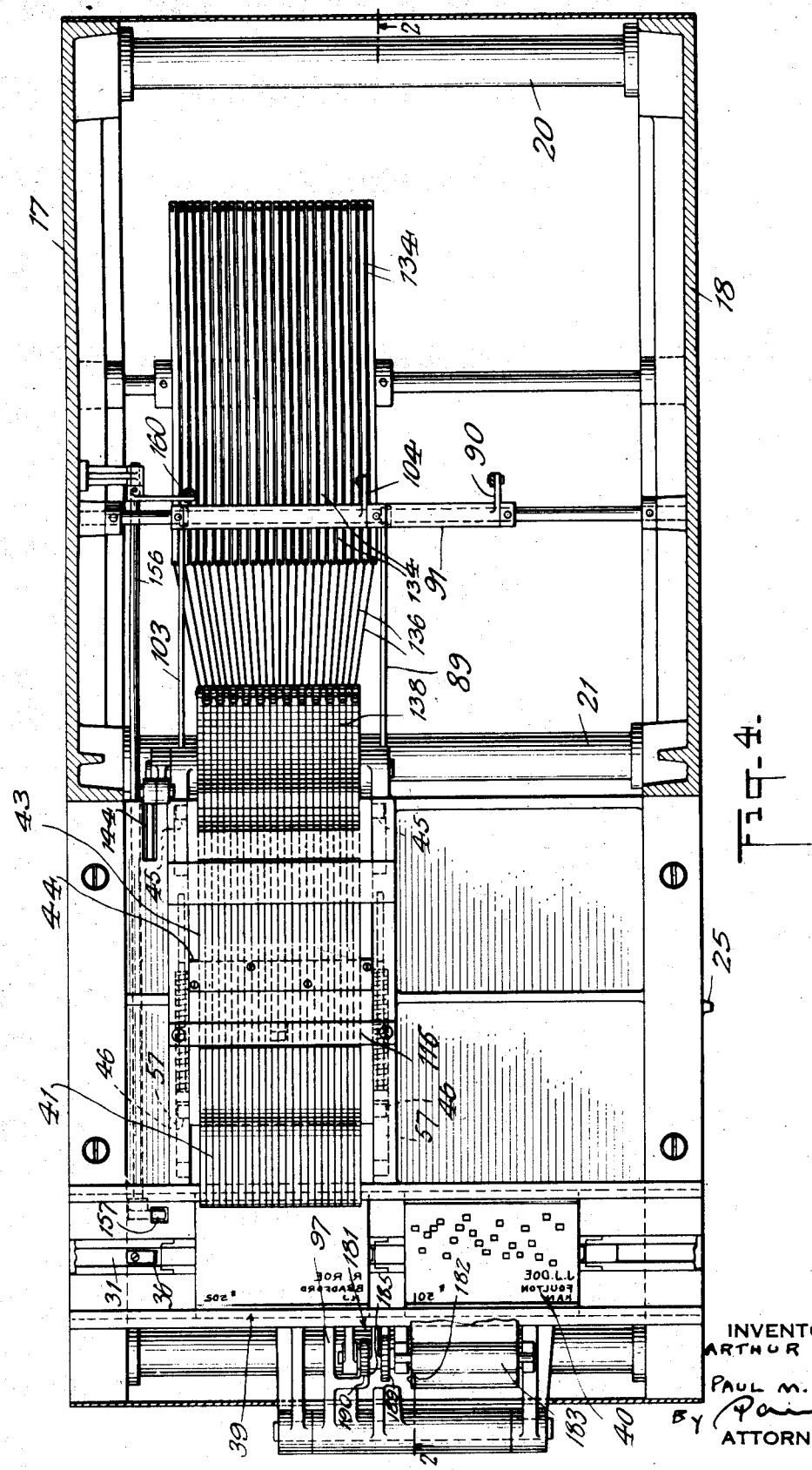

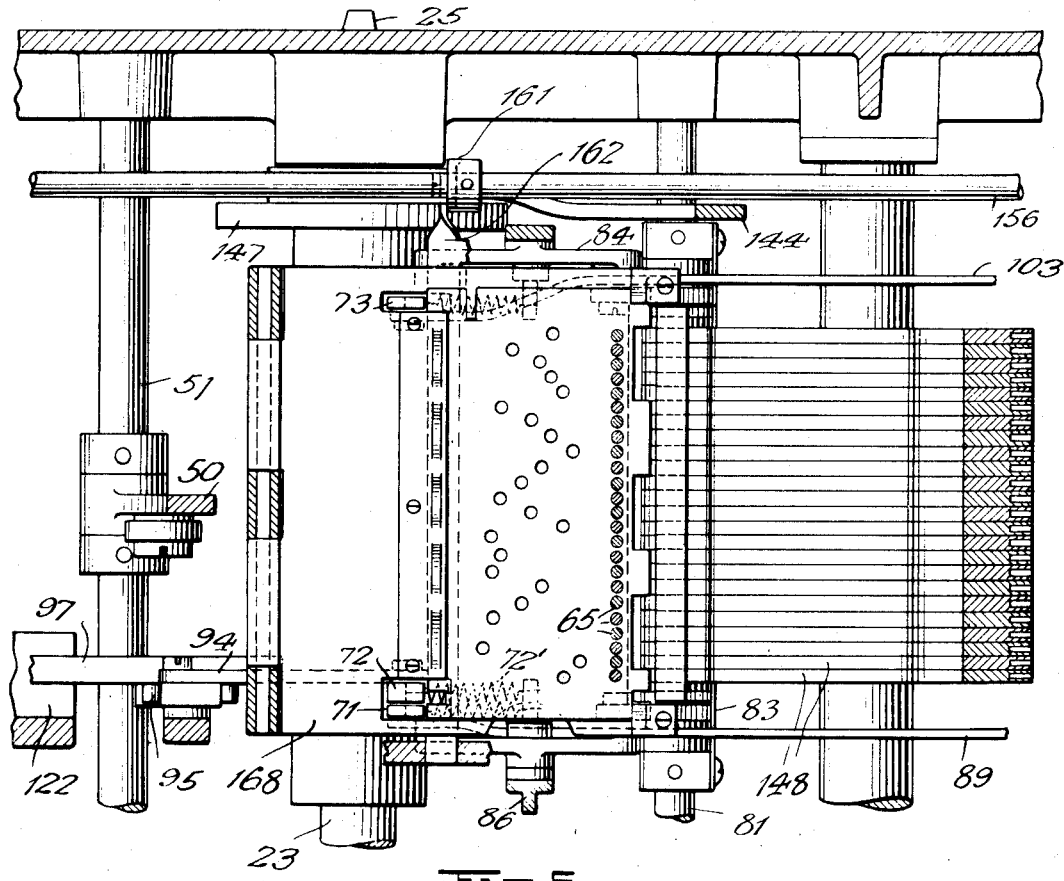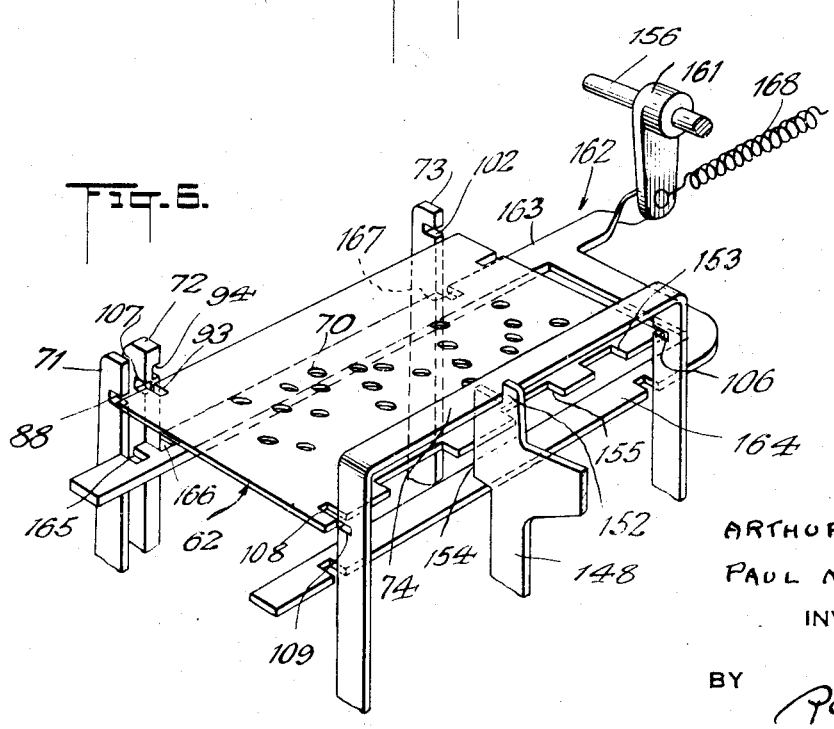

March 26, 1935.  A. H. ADAMS ET AL  1,995,595
TABULATING AND LISTING MACHINE
Filed Aug. 20, 1929   9 Sheets-Sheet 6
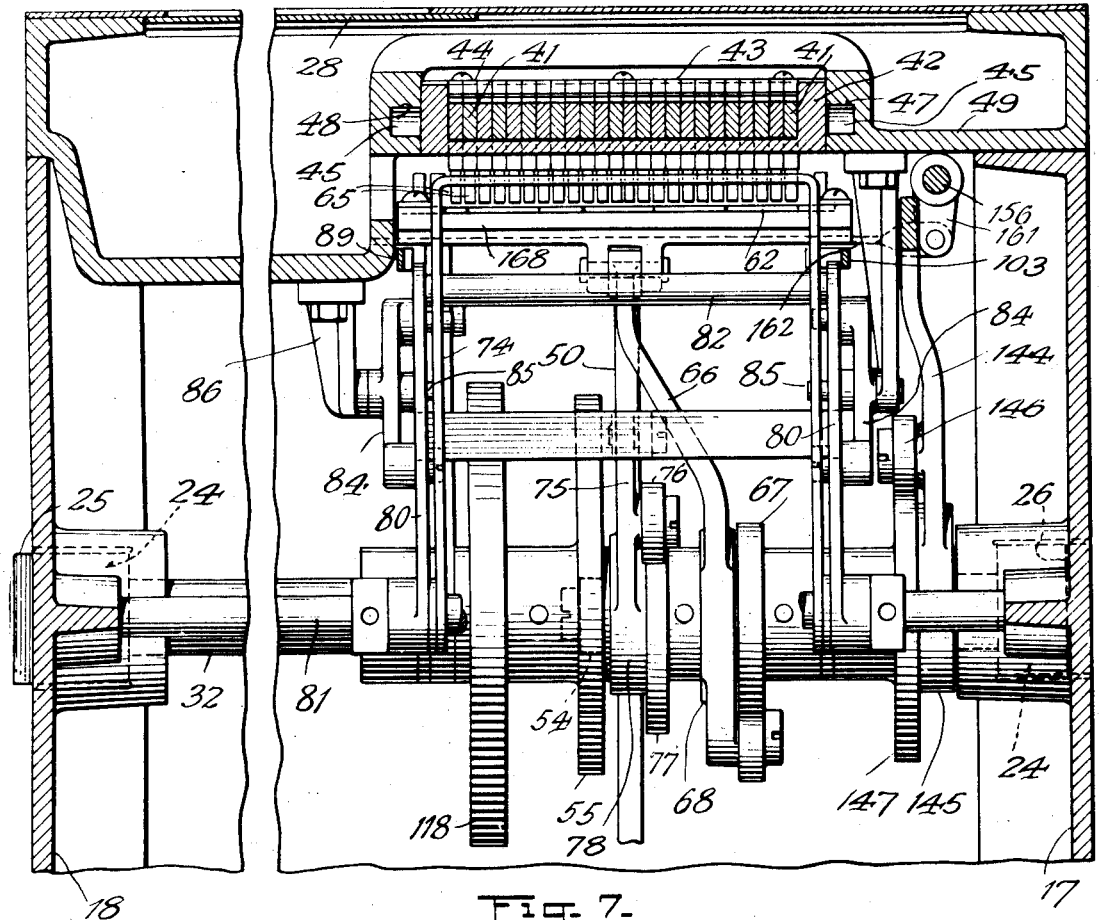
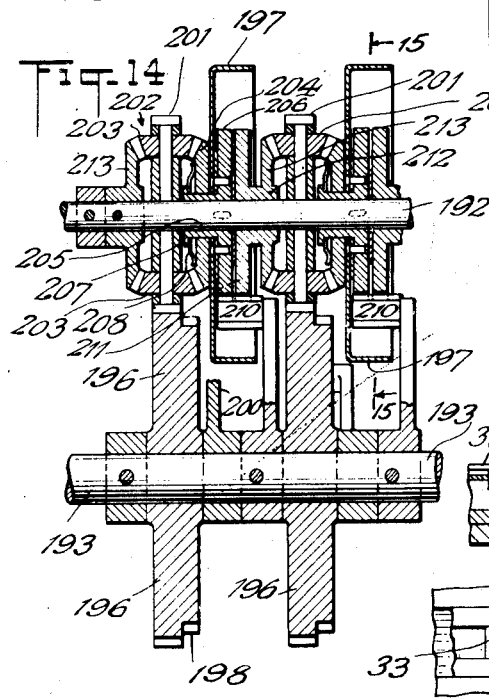
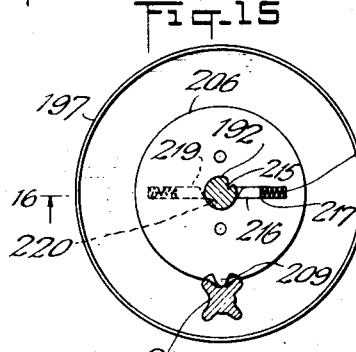
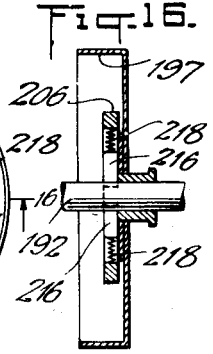
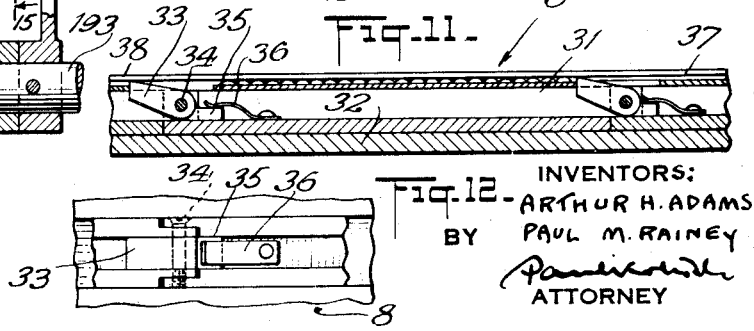
INVENTORS:
ARTHUR H. ADAMS
PAUL M. RAINEY
BY
ATTORNEY March 26, 1935.  A. H. ADAMS ET AL  1,995,595
TABULATING AND LISTING MACHINE
Filed Aug. 20, 1929   9 Sheets-Sheet 7
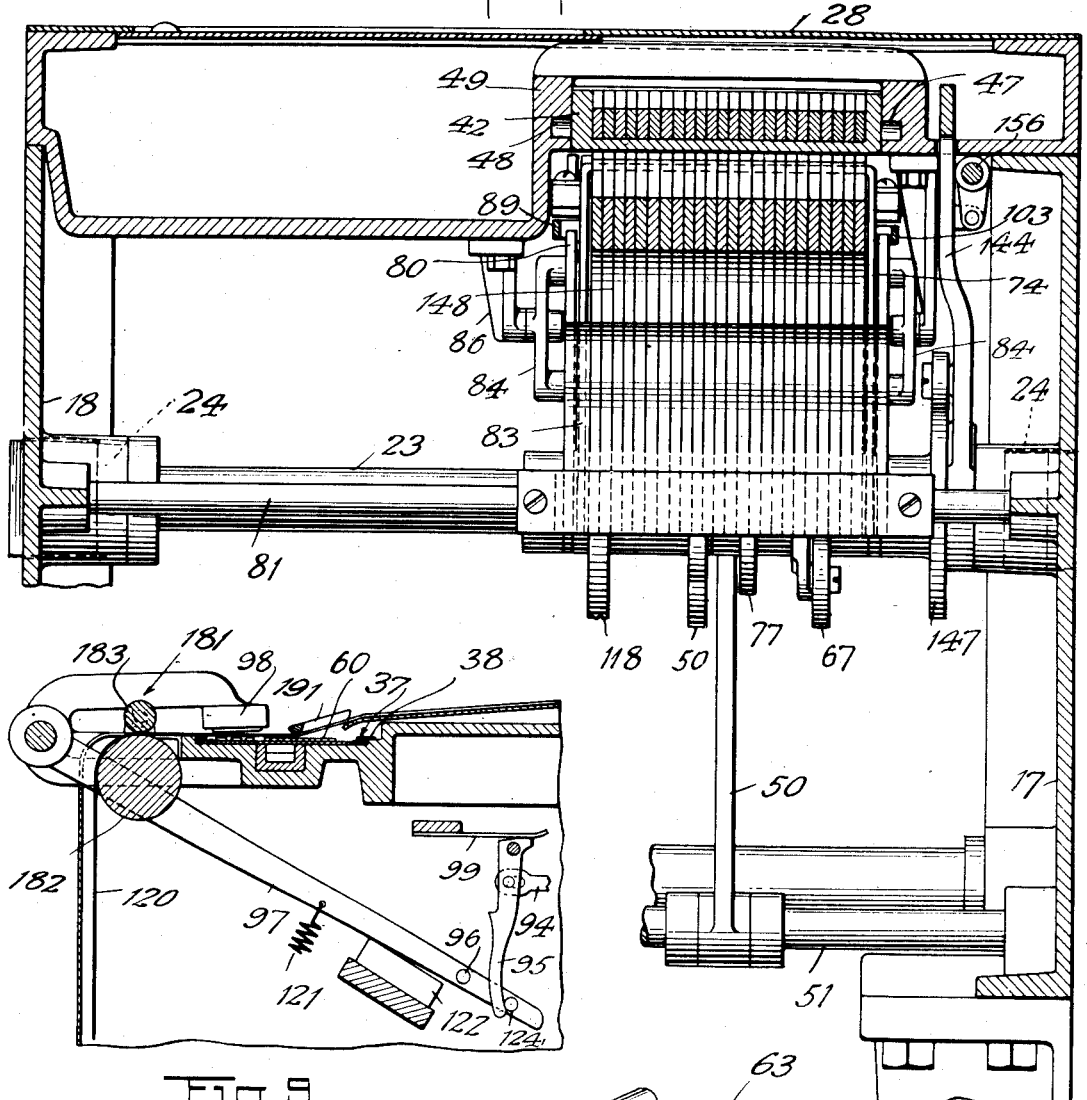
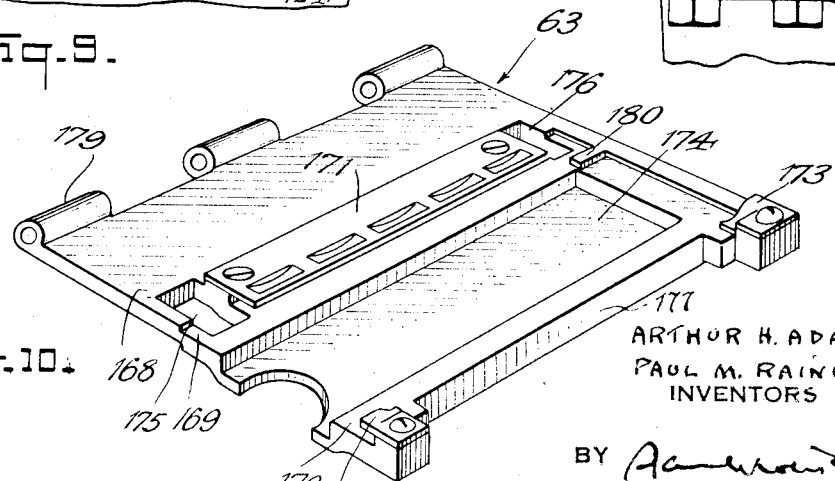
ARTHUR H. ADAMS
PAUL M. RAINEY
INVENTORS
BY
ATTORNEY March 26, 1935.  A. H. ADAMS ET AL  1,995,595
TABULATING AND LISTING MACHINE
Filed Aug. 20, 1929  9 Sheets-Sheet 8

ARTHUR H. ADAMS
PAUL M. RAINEY
INVENTORS

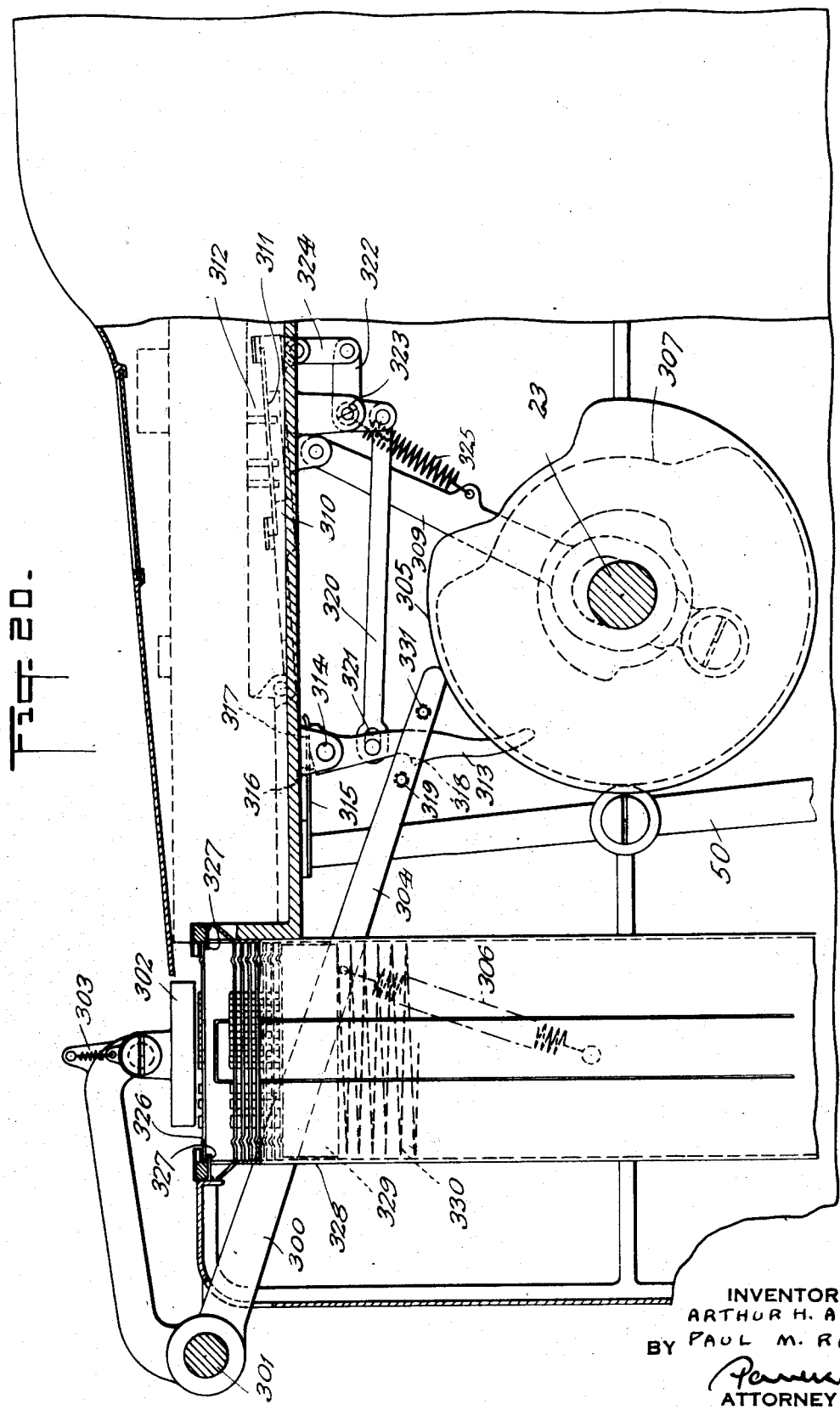

Patented Mar. 26, 1935

1,995,595

UNITED STATES PATENT OFFICE 1,995,595

TABULATING AND LISTING MACHINE

Arthur H. Adams, Yonkers, N. Y., and Paul M. Rainey, Montclair, N. J., assignors to Combination Selector Company, Incorporated, Montclair, N. J., a corporation of New Jersey Application August 20, 1929, Serial No. 387,131

20 Claims. (Cl. 235—58)

This invention relates to tabulating and listing machines of the type adapted to select from a large number of data-carrying cards or slugs certain ones conforming to any desired standard.

Broadly, the object of the invention is a combination addressing (or listing), tabulating and counting machine, wherein all indicia of the slugs or record members are available to determine selection or rejection, and wherein the selection or rejection of slugs or record members is determined by a matrix member which may also determine the disposition of the particular slug or record member as regards listing or printing information from said record member or for accumulating in an adding register numbers indicated by indicia in said slug or record member, sorting not being necessary to secure information.

More specifically, it is an object of our invention to provide an addressing or listing machine with numerical selecting, tabulating and sorting features.

Another object is the provision of a tabulating listing machine which is adapted to test indicia-bearing elements or slugs and tabulate data from either the selected slugs, rejected slugs, or all slugs.

Another feature is the provision of a tabulating listing machine having means for selecting slugs, and counting means for recording the number of rejected, accepted, and total slugs, and means for preventing counting when no slug is fed.

A further feature is the provision of a machine which is adapted to sort out different slugs having common characteristics, from a large number of slugs, the sorting operation being under the control of a control member or matrix.

Another feature is the construction of a tabulating listing and addressing machine which is adapted to perform a large number of different operations depending on certain guiding indicia carried by an interchangeable controlling member or matrix.

A further feature of our invention is the incorporation in a tabulating listing machine of a plural feed or differential accumulator which accumulates digits from numerical data, into all orders and carries over from one order to another simultaneously.

A still further feature is the provision of a tabulating listing machine comprising a plurality of units, all of which may be made identical and which are adapted to fit together so that slugs may be fed from one to another of the units and separate selections and tabulations made at each unit.

Another object is the provision of a listing machine indicia-bearing member, or slug, having a number of numerical data recording positions, each position having a plurality of indicia.

In accordance with our invention, a tabulating listing machine is constructed in the form of a plurality of identical or similar units which may be adapted to be readily interlocked in any desired series so that a common driving mechanism serves for the entire group, the drive shaft of one unit being detachably coupled to the drive shaft of the next unit. In addition to the tabulating and listing units, a power drive and slug or card feeding unit, and also one or more slug receiving magazine units are provided. The slugs or cards are fed from the slug feeding unit to the tabulating and listing units successively so that each unit acts at a different time on each of the slugs. The units may be provided with printing mechanisms and each may be adjusted to list and record different characteristics of the same slug or card or characteristics of different slugs or cards.

In addition the magazine unit or units may be adjusted so as to separate the slugs into two or more groups, according to the indicia borne by each slug.

In the preceding and following description the words indicia bearing element or slugs are intended to embrace in general any element carrying indicia of any form whereby information may be obtained. The elements may be made of thin metal, cardboard, or any sheet material marked by embossing, perforating or attaching identifying tabs or rivets. Likewise the slugs may be made of cast material provided with identifying characteristics in any suitable manner.

The words matrix and standard are used generally to designate any device representing definite preselected indicia corresponding to a certain set of conditions or presenting certain information. The matrix or standard may be made of sheet material such as metal or cardboard, suitably perforated, embossed or provided with identifying tabs, rivets or other suitable means. If desirable the matrix may be made of cast material suitably marked.

In the following description when I speak of comparing a slug with a matrix, or reading the slug I mean the step of comparing a slug with a matrix to determine whether some or all of the embossings, perforations, or added indicating marks carried by the slug are similar to the perforations, or other identifying indicia of the matrix.

Each unit comprises means for feeding a slug to a plurality of different positions, and means at the different positions for performing different actions upon the slugs. At the first position, the indicia on each slug are compared with a matrix or standard on which has been indicated the characteristics desired or not desired. Associated with the comparing or reading mechanism is means for determining the future action which may be taken with respect to the slug. For example, the data on the slug may be printed on a sheet of paper at a subsequent position. Likewise, means is associated with the reading mechanism for tabulating any desired numerical data indicated on the slugs. The matrix or standard is arranged to control the tabulating mechanism so that any part or all of the numerical data may be tabulated, different accumulating mechanism being provided for the individual parts thereof. In order to insure that false tabulation will not result when the indicating members or slugs are not being fed, blocking means is furnished for preventing both printing and tabulating when no slug is fed. Means is also provided for counting the total number of slugs fed as well as the rejected or accepted slugs.

Where it is desired to sort into a group slugs having certain predetermined characteristics a magazine unit may be adjusted to select the desired slugs and reject the rest.

For the tabulating of the numerical data carried by the slugs, a differential or plural feed accumulator is used. This accumulator is adapted to carry digits into all orders at the same time and simultaneously carry over from one order to the next whenever necessary. We have also arranged our mechanism so that one long accumulator may be used and be divided into a plurality of recording groups so that a certain number of indicating positions will record one series of results and another number of positions will record another series of results. This arrangement is particularly useful where the data carried by the cards may be of widely different characteristics, for example, one group may require a maximum number of five (5) digits corresponding to a number running to tens of thousands whereas other data may require but 3 digits therefore, running only to hundreds. The machine may likewise be used on slugs which have the data arranged differently altogether, for example, it may be arranged to form one group of figures running to totals of the order of millions in which case the entire length of the accumulator might be used. We have also arranged the actuating mechanism for the accumulator so that the data contained on one portion of a slug may be fed into any portion of one accumulator or into any one of several accumulators, as desired.

Reading of the indicia on the slugs is preferably accomplished by a group of feeling fingers, which are thrust into engagement with the slug to set up an indication, and then instantly lifted free from the slug so as to permit the advancement thereof to a succeeding position.

Broadly the entire invention comprises a machine each unit of which is adapted to choose desired from undesired slugs, and print and/or tabulate predetermined data from selected or rejected slugs, both or neither, or sort the slugs into groups, all these functions being controlled independently for each unit of the machine by a prefashioned matrix.

The machine may be put to many different uses depending on the kind of business in which it is used and data on which information is desired. The indicating members or slugs used in the machine may be made either of sheet metal, cardboard, or other material provided with embossed projections, perforations or other suitable indications as heretofore stated, the position of which indicates data carried by the slug. The slugs may likewise be made of cast metal with the projections integral therewith. Or the projections may be of the form of pins or rivets added to a slug. Any information which it is desired to print from the card may be incorporated in the slug in raised symbols like type or cut out to form a stencil. When it is desired to file or record data regarding certain persons or transactions, it is merely necessary to impress upon or attach to the slug projections in the correct positions or perforate the slug in a corresponding manner. While the slugs may be of any type and arranged to have any number of positions and characteristics, I find it advantageous to utilize 21 rows of projections indicating certain group characteristics, each row being capable of carrying 10 projections, or more normally one projection in any one of ten different places in the row. The particular location of the projections in each row serves to indicate the detail characteristic of that particular main characteristic indicated by the position. When it is desired to select a group of slugs carrying certain information, it is merely necessary to arrange a proper matrix which is provided with perforations or other identifying characteristics corresponding to the different desired detail characteristics of the slugs. This matrix is inserted in one of the units and the various slugs run through the machine thereby causing the desired information either to be tabulated or printed, or both, by that unit. At the same time a record may be kept of the total number of accepted slugs, rejected slugs, and of both lots.

The above mentioned and further objects and advantages and the manner of attaining them will be made clear in the following description and accompanying drawings.

In the drawings, Fig. 1 illustrates in plan view a plural unit tabulating listing machine constructed in accordance with our invention.

Fig. 2 is a sectional view taken along section line 2—2 of Fig. 1.

Fig. 3 is an enlarged sectional view taken along line 3—3 of Fig. 1, showing the feeling fingers in actuated position immediately after having read an accepted slug. The printing hammer mechanism is shown as unlocked ready to print from the slug at a later interval of time, and the tabulator mechanism is shown as actuated, having set up an indication on the accumulator dials.

Fig. 4 is a sectional view taken along line 4—4 of Fig. 2.

Fig. 5 is a sectional view taken along line 5—5 of Fig. 2 showing a detail matrix holding mechanism.

Fig. 6 is a skeleton isometric view of the matrix and cooperating tabulating and printing control fingers.

Fig. 7 is a fragmental sectional view taken along line 7—7 of Fig. 2 or Fig. 3. In this view the tabulating fingers have been removed for the sake of clarity.

Fig. 8 is a view similar to that of Fig. 7 with the tabulating fingers left in position.

Fig. 9 shows the printing mechanism in the act of printing information carried by a slug.

Fig. 10 is an isometric detail view showing the matrix holder.

Fig. 11 is a sectional elevation view of the slug feed mechanism.

Fig. 12 is a fragmental plan view of the same mechanism.

Fig. 13 is an assembly view of one of the differential accumulators.

Fig. 14 is a detail sectional view of a portion of the mechanism shown in Fig. 13. This view is taken along a line drawn parallel to the plane of the paper and across the axis of the number wheels.

Fig. 15 is a sectional view taken along line 15—15 of Fig. 14.

Fig. 16 is a sectional view of part of the accumulator mechanism, taken along line 16—16 of Fig. 15.

Fig. 17 is a view, partly in section showing the reset stop mechanism, taken along line 17—17 of Fig. 13.

Fig. 20 is a sectional view in end elevation taken along line 20—20 of Fig. 1 showing the slug sorting mechanism.

Figure 18:
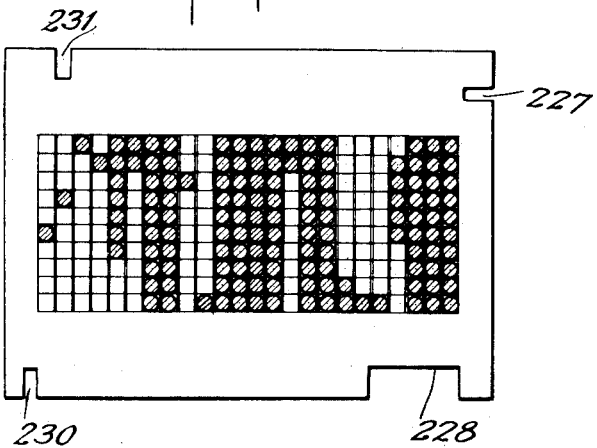
Figs. 18 and 19 illustrate respectively a matrix and a slug.

Referring more particularly to the drawings, Fig. 1 shows a listing, tabulating machine constructed in accordance with our invention, and comprising a power unit 1, a series of tabulating listing units 2, 3 and 4 and slug sorting or receiving magazine units 5 and 6. Slugs are fed from a magazine 7 in unit 1 along a conveyor 8 through the several units, wherein the slugs are acted upon in the desired manner, and finally some or all of them stored in a receiving magazine 9. Power for driving the entire working mechanism is derived from an electrical motor 10 which is enclosed in the power unit 1, and a series of driving gears 11 which serve to actuate the power shafts on the various units. Associated with the drive shaft of the motor 10 is a clutch 12 which is of any well known type adapted for stopping the gears 11 in a certain predetermined position every time the clutch is released. For operating the clutch a control lever 13 is utilized. When it is desired to stop the progression of slugs through the various units, the lever 13 is turned, whereupon the motor 10 is freed from the gears 11 by means of the clutch 12. Because of the particular construction of the clutch, the gears always stop at exactly the same position, and therefore leave the slugs in the machine at exactly the same point each time the machine is stopped.

After having passed through all of the preceding units the slugs may be stored in either of the receiving magazines 9 or 9'. This may be accomplished in any desired manner, for example, in magazine 9 by pusher plate 14 which thrusts towards and away from the magazine 9 by means of a suitable linkage 15 driven from a power shaft 16. Each time the pusher plate moves towards the magazine it forces downwardly a slug which has been fed on top of the magazine. The slugs entering the magazine under pressure from the pusher plate may, for example, cause a frictionally held bottom in the magazine to move sufficiently to accommodate the slugs successively thrust therein. The magazine 9' may be controlled by a matrix either to collect all slugs or only those having certain predetermined characteristics. The manner in which this is brought about is explained more fully hereinafter.

The units 2, 3 and 4 may be all identical, each one comprising a pair of side plates 17 and 18 held together by suitable tie rods 19, 20, 21 and 22. (Figs. 2 and 4). For supplying the power necessary to operate the mechanism of each unit, a drive shaft 23 is provided. This shaft has at each end suitable coupling means 24 so that when two units are bolted together, or when one unit is secured to the power unit, the two shafts will be mechanically interlocked through the agency of the couplings carried thereby. As shown in Fig. 7, the coupling may comprise a key portion or feather 25 secured to the end of the shaft 23 and adapted to engage a slot or keyway 26 in the corresponding shaft of another unit. As all of the units are the same, each shaft 23 will have at one end a key 25 and at the other end a keyway 26. Two adjacent units may be clamped together by means of bolts 27, which pass through the walls of the plates 17 and 18. The entire working mechanism is enclosed by a suitable housing 28 which may be of sheet metal or other material.

Slugs are fed one at a time from the magazine 7 in which they are stacked vertically, by a conveyor 8. This conveyor is reciprocated by means of a gear 29 forming part of the gear train 11 and having connected thereto a connecting rod 30, the other end of which is secured to the conveyor. (See Fig. 1).

The construction of the conveyor will be more clearly understood by reference to Figs. 3, 11 and 12. As shown in these figures, it comprises a slidable channel member 31 carried in a guide trough 32. Pivotally mounted within the channel member is a series of pushing pawls 33 which are pivoted to 31 at 34. Each pawl has a tail 35 which is held against the bottom of the channel member by means of a spring 36. The spring is sufficiently resilient so that when the conveyor is reciprocated backwardly to get another slug from the magazine, the pawls 33 will be moved down into the channel 31 thereby sliding underneath the slugs in the conveyor trackway during the return motion. After clearing the rear end of each slug, the pawls 33 snap upwardly, and upon advance motion of the conveyor, serve to carry the slugs forwardly to their new positions. For guiding the slugs through the various units, a trackway 37 is furnished. (Fig. 9.) The trackway is so constructed as to subject the slugs to a frictional retarding force during their passage therethrough. This may be accomplished by having on the trackway resilient hold-down plates 38 which press the slug firmly against the track.

The conveyor 8 is made separable in a suitable fashion so that the units may be detached one from the other. The pivotal point 34 may serve as a separation point for the conveyor as well as for supporting the pawl 33 (Figs. 11 and 12).

Each unit has two operating positions, as shown most clearly in Fig. 4. One of these is the reading position 39 and the other the printing position 40. The throw of the connecting rod 30 is just enough to advance a slug from one of these positions to the next, and the width of the units is just great enough so that a slug in advancing from the printing position of one unit to the reading position of the next unit, passes through one idle position.

At the reading position 39, a plurality of reading fingers 41 are provided. (See Figs. 2, 3, 4, 7 and 8.) These fingers are slidably positioned in a carriage 42 and are held against displacement by means of friction retarding springs 43 which are secured to a suitable holding member 44 fastened to the carriage 42. (Fig. 7.) The carriage in turn is supported by two pairs of pins 45 and 46 sliding in grooves 47 and 48 in a cross frame member 49 (Figs. 7 and 8) attached to the side plates 17 and 18, and the carriage is reciprocated by a lever arm 50 (Figs. 2 and 3) which is pivotally supported on a rod 51 extending between the two side plates 17 and 18. The upper end of the arm is pivotally secured to a U-shaped projection 52 on the carriage 42 by means of a pin 53. The holes through which the pin passes in the U-shaped member are made slightly elliptical so that rotary motion of the lever arm may be translated into rectilinear motion of the carriage traveling in its grooves. The arm 50 carries a cam rider 54 which engages a cam 55 mounted on shaft 23. In Fig. 2 the carriage is shown in its retracted position and Fig. 3 in its advanced position. As the carriage is advanced by the cam 55, pins 46 are forced downwardly toward the rod 51 by means of a cam surface 56 (Figs. 2 and 3) on the face of a member 57 slidably arranged in the member 49 and held in a forward position by a spring 58. This movement forces all of the feelers or fingers 41 down to the level of the top of the slug 59, which is in a ready position. As the carriage continues to advance towards the left, the fingers 41 encounter the embossed projections 60 on the slug 59 and are stopped thereby. Each feeler upon encountering a projection instantly stops, and while the carriage continues to move forward, remains in a stationary position. This action is permitted because the feelers are held only frictionally with respect to the carriage 42, by spring fingers 43 and hence if retarded sufficiently stand still and remain in which ever position they may be stopped. The carriage advances fully to the left position as shown in Fig. 3; then the pin 46 reaches the end of the member 57, permitting the carriage 42 immediately to rise to the position shown in Fig. 3, under the influence of spring 61, thereby freeing the feelers 41 from the slug 59 and permitting the slugs to be advanced another step by the conveyor 8. While the feelers are held in their forward position by the dwell in the cam 55, matrix 62 carried in a holder arm 63 rockably secured to the frame of the machine at 64, is moved into engagement with a plurality of indicator fingers 65, one of which is carried by each of the feelers 41. The arm 63 is rocked so as to move the matrix, by a push rod 66 which is normally urged to a downward position by means of a cam 67 carried by the shaft 23, and is urged upwardly by a spring 69, attached to a stationary rod 69'. The push rod is held in its proper operating position by means of a collar 68 (Fig. 7) which encircles the shaft 23. The collar has an elongated opening therein which permits the necessary endwise motion of the rod. At the proper instant of time; that is, when the fingers 41 have assumed the position shown in Fig. 3; cam 67 permits the push rod 66 to rise under the influence of spring 69, thereby thrusting the matrix into engagement with the ends of the indicator fingers 65.

The matrix is provided with a plurality of holes 70, as best shown in Fig. 6, which are punched to correspond with a desired arrangement of the embossed projections 60 on the slug 59. If the arangement of the indicator fingers 65 corresponds to an arrangement of holes 70 in the matrix, the matrix will rise under the influence of the spring 69 to the position shown in Fig. 3. After the push rod 66 has risen to elevate the matrix, and during the dwell of cam 67, three feeling fingers 71, 72, 73 and a feeling bail 74 are thrust into engagement with the edges of the matrix. This is brought about by means of a push rod 75 having a cam rider 76 which engages with a cam 77 carried by the shaft 23. The end of the push rod 75 has a collar 78 arranged similarly to collar 68 of the push rod 66 (see Fig. 7), for the purposes of maintaining the push rod in its proper alignment. The rod 75 is moved toward the shaft 23 by means of suitable springs 83, thereby rotating a pair of arms 80, pivotally supported by a shaft 81 secured to the side plates of the machine. Interconnecting the two ends of the arms 80 is a tie rod 82. This tie rod normally engages the edges of the bail 74, but by the action of the rod 75, is moved to the left, as viewed in Fig. 3, out of engagement with the edges of the bail, permitting the bail to rotate to the left under the influence of the springs 83 and engage the right hand edge of the matrix 62. Rod 75 is secured to the arms 80 at 84' and at this same point an elongated or slotted pivotal connection is made to a pair of rocker arms 84 which are pivotally mounted on a shaft 85 secured to the frame of the machine at 86 (Fig. 8). Rocker arms 84 carry at their other end a tie rod 87 which normally engages the edges of the feeling fingers 71, 72 and 73 thereby maintaining said fingers in a position out of engagement with the matrix. As the rod 75 moves to the left, permitting the bail to engage the edge of the matrix, tie rod 87 is rotated in a right hand direction with respect to the shaft 85 thereby permitting the feeling fingers to move toward the matrix in a right hand direction and contact with the edge thereof. Finger 71 has a notch 88 (Fig. 6) which registers with the edge of the matrix 62, if the martix is in the lower or unelevated position (as distinguished from that shown in Fig. 3). If the matrix is in the lower position, the finger 71 moves first slightly, i. e. to the edge of the matrix which enters the notch 88 thereby permitting further movement to the right; in moving to the right the finger 71 pushes the rod 89 connected with an arm 90 secured to a hollow shaft 91, which in turn through suitable mechanism, actuates a reject counter 92 (Fig. 1). The counter 92 serves to record the number of slugs which do not compare with the matrix. When the matrix is in the upper position, as shown in Fig. 3, the finger 71 is unable to move to the right, being blocked by the edge of the matrix, and hence no count is made on the reject mechanism.

When the matrix is in the upper position, finger 72 is permitted to move to the right in a clockwise direction, (best understood from Fig. 6), the edge of the matrix as shown having a notch 93 which cooperates with a notch 94 in the finger thereby permitting the finger to move into the edge of the matrix. As the finger moves in under the influence of a spring 72' (Fig. 5), it draws a drag link 94 to the right, thereby moving the lower end of a locking pawl or dog 95 in the same direction (see Fig. 3). This movement of the dog unlatches it from a pin 96 secured to the end of a bellcrank 97 carrying at its other end a printing head 98. The dog 95 is held in the right hand position by leaf spring 99 which engages a flattened face 100, near the pivotal point 101 of the dog. This action results in a further operation which will be explained in detail hereinafter.

With the matrix in its upper position, the feeling finger 73 moves to the right similarly to 71 (see Fig. 6), and passes the edge of the matrix by virtue of a notch 102 in the finger. This movement thrusts a rod 103 (Figs. 4 and 5) to the right thereby rocking bellcrank 104 (Fig. 4) causing a count to be registered on accept counter 105 (Fig. 1).

In this position of the matrix, the matrix being cut as shown, the feeling bail 74 will also move inwardly, notch 106 therein registering with the edge of the matrix. This movement of the bail permits a further action to take place which will be described more fully hereinafter.

When the matrix, cut as shown, is in the lower position, as shown in Fig. 6, fingers 72 and 73 and bail 74 are blocked and prevented from inward movement. In Fig. 6, notch 93 is arranged to cooperate with notch 94 in the finger 72, but might be arranged to cooperate with notch 107 instead, in which case unlocking of the printer bellcrank 97 would occur when the matrix was in its lower position. Likewise the bail 74 might be permitted to move to the left when the matrix is in its lower position, rather than in its upper position as now indicated. This might be done by placing the notch 108 in the matrix so as to cooperate with the bail on the side having the notch 106 instead of the side having the notch 109.

After the dwell 110 in cam 77 has passed, pull rod 75 is thrust to the right thereby rocking the tie rods 82 and 87 against the fingers 71, 72, 73 and bail 74, freeing these members from the matrix. The matrix then recedes under the influence of cam 67. Shortly thereafter cam 55 has turned sufficiently to permit arm 50 to move to the right. Carriage 42 therefore moves back to its initial position under the influence of a spring 111 (Fig. 2). Upon return movement of the carriage, a square corner 112 of pin 46 engages the end of member 57 and carries the member in a right hand direction along with the carriage. At approximately the end of its path of movement, a projection 113, on a member 114 secured to the carriage 42, engages a similar projection 115 on a stationary bar 116. The engagement of these two projections pushes the carriage down thereby causing the square corner 112 of pin 46 to disengage from member 57, which member is thereupon thrust forward to its initial position by spring 58. Upon the return movement of the carriage, all of the fingers 41 strike a stop and are automatically adjusted to the initial position ready for another testing movement.

After the card 59 has been tested or read, and advanced to the printing position, tail 117 of bellcrank 97, which rides cam 118, drops into depression 119 in the cam thereby causing the printing head 98 to force paper 120 against embossed characters carried by the slug 59 (Fig. 2). An inked ribbon or other suitable means (not shown) may be provided in the usual well known manner to cause a printed record to be made on the paper. It will be remembered that the locking dog 95 was previously released from the pin 96 by movement of the feeler finger 72 to the right, the position shown in Fig. 3. The downward movement of printing head 98 is made very rapid by a tension spring 121. The tail 117 of the bellcrank strikes a rubber bumper 122 just before the printing head forces the paper against slug 59. This bumper is sufficiently resilient to allow the head fully to press the paper against the slug, and thereupon instantly thrusts the bellcrank and head back in a counter-clockwise direction a slight distance so that the head will be free from the paper, allowing the slug 59 to be advanced another step. Further rotation of the shaft 23 causes the rise 123 in the cam 118 to return the bellcrank 97 to its normal position. In this position, it is locked by the dog 95 which has been returned to locking position by pin 124, which struck the dog during the downward printing movement of bellcrank 97, thereby flipping the dog back to its locking position. It is maintained locked by spring 99 engaging flattened face 125 thereof.

The slugs running through the machine may in many cases have embossed thereon certain projections indicating numerical data which it may be desirable to integrate or accumulate from several cards. These projections are so positioned on the slugs that movement of the feeler fingers 41 crossing the slug is dependent on the value of the digit indicated. Thus for 1, a finger will move but a slight distance whereas for 9 the finger will move 9 times as far.

For accumulating or integrating the numerical data from the slugs acted upon, a series of counters 126, 127 and 128 are provided. These counters are interconnected by groups of pull wires 130, 131, 132 and 133, which are fastened to rocker arms 134 pivoted to the frame of the machine at 135. To the other ends of the rocker arms is attached a series of pull wires 136 which in turn are connected to the ends 137 of a series of indicator arms 138, each having a serrated edge 139, with 9 teeth spaced at different radial lengths from the pivot shaft 140 of the arms. Each of the indicating arms has a lost motion slot 141 in which is arranged to travel key 142 attached to the shaft 140. Shaft 140 is rockably mounted and has secured to one end thereof a crank arm 143 to which is pivotally connected a push rod 144. Push rod 144 is supported in operating position by means of a collar 145 mounted on shaft 23 and having an elongated opening therein similarly to rods 66 and 75. A cam rider 146 is attached to push rod 144 and travels on a cam 147 (Fig. 7). When, rod 144 and travels on a cam 147 (Fig. 7). When by the action of cam 147, push rod 144 is thrust upwardly thereby rocking shaft 140 in a right handed direction, key 142 engages the right hand end of lost motion slot 141 and rotates all of the indicator arms 138 to the position shown in Fig. 2. The arms are locked in this position by means of a series of levers 148 having catching fingers 149 provided with spring latches 149' which engage with locking teeth 150 at the end 137 of the arms. The levers 148 are pivotally mounted on a shaft 81 supported by the side plates 17 and 18. These levers are held locked in retracted position by the feeling bail 74 which engages with a projection 152 at the top end of the levers (Fig. 6).

When the bail 74 is permitted to move to the left by engagement of notch 106 with the edge of the matrix, levers 148 are permitted to move to the left under the influence of springs 83 thereby withdrawing latches 149' from engagement with teeth 150. Key 141 having previously been rocked counterclockwise by the action of rod 144 and its associated cam, springs 153 attached to the end 137 thereupon rotate indicator arms 138 left-handedly until the teeth 139 thereof engage with the ends of the corresponding feeling fingers, thereby stopping the arms in the correct position corresponding to the numerical value indicated by the position of the feeler fingers. Rotation of the indicator arms in a counter-clockwise direction rocks rocker arms 134 thereby causing an indication to be made on the corresponding counters, which may be any of 126, 127 and 128.

The edge of matrix 62 engages the edge 154 of the locking levers 148 at certain points and at these points, even when the feeling bail 74 is permitted to move to the left, the locking levers cannot move, hence the indicator arms 138 remain locked. In order to permit the indicator arms to move, it is merely necessary to provide suitable notches 155 in the edge of the matrix. The notches 155 should be placed in alignment with the feeling fingers 41 engaging with the projection on the slug 59 which indicates the data it is desired to tabulate. The portion of the edges left unnotched would therefore correspond to data not numerical or to data which might be numerical but which it would not be desired to tabulate. It is also possible by proper arrangement of the notches 155 to cause each accumulator to register a series of results, each one containing a plurality of digits and each of the series separated from its neighbor by one or more zeros corresponding to inactive indicator arms. Because of the arrangement of the pull wires 130 to 133 and the rocker arms 134, it is possible to interconnect any desired group of indicator arms 138 with any of the accumulators or parts of the accumulators 126, 127 and 128. This feature may be of use where it is desired to set up on one part of the accumulators one series of indications and on another part of the accumulators another series of indications. By this arrangement it is possible to make information having the same characters appear in the same position on the accumulators of the units regardless of the position which that information occupies on different groups of slugs run through the machine at different periods of operation. Likewise it is possible to arrange, through this interconnecting feature, the data on the different accumulators of a unit in vertical columns so that addition or subtraction may be made as desired.

For counting the total number of slugs passed through the different units, a counting arrangement is utilized, comprising a rock shaft 156 rotatably supported by the frame of the machine and carrying at one end a finger 157 which projects up into the path of movement of the slugs 59. As each slug passes to the reading position it encounters finger 157 thereby rotating it and the rock shaft 156. Rotation of the rock shaft is communicated to a counter 158 by means of an arm 159 attached to the shaft and a link 160 connecting the arm with the counter.

In order to prevent the feeling fingers 71, 72, 73 and bail 74 from giving a false indication when no slug passes to the reading position, an arm 161 (Fig. 6) is secured to the rock shaft 156. This arm is pivotally secured at the end thereof to a U-shaped locking bar 162 having two legs 163 and 164. Leg 163 has notches 165, 166 and 167, which, when the bar 162 is thrust forward by the action of a slug encountering the finger 157, registers with feeling fingers 71, 72 and 73 thereby permitting them to move toward the edge of the matrix. In like manner leg 164 is provided with notches which register with the two sides of the bail 74. When there is no slug in the reading position, the locking shaft is rotated by spring 168 so that the bar 163 is moved backwardly into locking position. The feeling fingers and bail will then be prevented from movement towards the edge of the matrix.

The matrix holder arm 63 comprises a plate 168 (Fig. 10) having a pair of guides 169 and 170 for supporting the matrix, which is held therein by means of spring clips 171, 172 and 173. Intermediate the edges of the guides 169 and 170 is a channel 174 which provides a free space underneath the matrix. For permitting access of the feeding fingers 71, 72 and 73 and the bail 74, openings 175, 176 and 177 are furnished. These openings permit the feeling fingers to contact with the edge of the matrix without interference. The plate 168 has at one end thereof hinge knuckles 179 which form a part of the pivotal joint 64.

In order to insure that the proper matrix card will be inserted in the proper unit, a selecting key 180 is utilized. This key fits into a slot in the end of the proper matrix but prevents any matrix not having the proper slot from being fully inserted into the holding arm. This selecting key is preferably located at one side of the center line of the matrix so that the matrix must necessarily be inserted right side up so that a false reading of the slugs will not occur.

Each time that printing of a slug occurs, the sheet of paper upon which the printing record is impressed must necessarily be fed ahead a step. This is accomplished by means of the paper feed mechanism 181. This mechanism comprises a pair of friction rolls 182 and 183 of rubber or other material, between which a strip of paper 184 passes. The two rolls are pressed together firmly enough to insure feeding of the paper upon rotation of the rolls. (Figs. 2, 3, 4 and 9.) The mechanism utilized for rotating the rolls, comprises a gear 185 rotatably mounted on the shaft 186, which carries roll 182. Fastened to the gear 185 is an arm 187 carrying a spring pressed ratchet pawl 188 which meshes with a toothed ratchet wheel 189, keyed to the shaft 186. Secured to the printing bellcrank 97 is a gear sector 190 which meshes with the gear 185. In operation, as the tail of the bellcrank 97 descends to cause a printing action, gear 185 is rotated in a counter-clockwise direction as viewed in Fig. 3, causing pawl 188 to slip over the teeth of ratchet wheel 189. When the bellcrank 97 is returned to its normal inactive position by cam 118, gear 185 is rotated by sector 190, thereby causing pawl 188 to engage ratchet wheel 189 and feed the strip of paper 120 ahead another step for receiving a fresh impression. The paper is fed from the rolls under a guide bar 191 and thence may be allowed to travel up the face of the housing 28, or roll up on any suitable reel.

*The accumulators*

Each of the accumulators 126, 127 and 128 is preferably of the differential plural feed type as illustrated, but may be of the ordinary kind if desirable. Figs. 13, 14, 15 and 16 show detail views of one of these accumulators. Each accumulator comprises a main shaft 192 and a supporting shaft 193 (Fig. 14). Shaft 193 is fixedly mounted in a pair of frames 194 and 195, while shaft 192 is rotatably mounted therein. On the supporting shaft 193 is rotatably mounted a series of gear wheels 196, one for each numeral wheel 197. Each gear wheel has a ratchet portion 198 with which it engages a pawl 199 (Fig. 2) carried by an arm 200 journaled on the shaft 193. To this arm is attached one of the pull wires 130 or 131. Rotatably mounted on shaft 192 and meshing with gear wheel 196 is a ring gear 201 of a differential 202. Rotatably mounted at right angles to the radius of the ring gear 201, in the manner common to differentials, is a plurality of spur gears 203. Meshing with these spur gears on the right hand side of the ring gear is a bevel gear 204 which is mounted on a sleeve 205 having a flange 206, to which is secured the numeral wheel 197. Sleeve 205 has at its left hand end a small rim 207 between which and the inner face of the bevel gear 204 is interposed a spring washer 208. This spring washer presses the bevel gear 204 into frictional engagement with the face of the numeral wheel 197. Flange 206 is provided with a gear tooth 209 forming, with a pinion gear 210, the usual form of "hunting tooth" movement or one revolution counting mechanism, such as used in odometers. Likewise journaled on shaft 192 and in constant mesh with pinion 210 is a gear 211. This gear has a sleeve 212 which is formed integrally with a bevel gear 213. Gear 213 meshes with the left hand side of the bevel pinions 203 of the numeral wheel of the next higher dimension. The bevel gear 213 of the left hand (as seen in Fig. 14) or zero one of the group of number wheels necessarily has to be keyed to the shaft 192 but all of the other similar gears are rotatably mounted on said shaft.

Resetting of the accumulator so that all zeros appear at the sight opening is accomplished by rotating a knob 214 secured to the end of the shaft 192, thereby rotating the shaft, causing a notch 215 therein to engage a latch 216 slidably positioned in a keyway 217 in the flange 206, and press into engagement with the shaft by means of a spring 218. Rotation of shaft 192 therefore causes rotation of the alternate number wheels 197, in one direction to a zero position. Rotation of the shaft in the opposite direction causes the alternate series of the number wheels to be rotated to zero position by engagement of a similar latch 219, facing in the opposite direction to 216, with notch 220 which cooperates therewith. The two oppositely facing notches and sets of latches provided for the two series of alternate position humber wheels are necessary because successive number wheels rotate in opposite directions during the operation of the accumulator. Such rotation occurs because of the inherent method of operation of the differential accumulator as explained hereinafter.

Assurance that the number wheels will be set exactly at zero is had by the provision of a three fingered pivotal stop mechanism 221. The three fingered stop 221 is pivotally mounted on an ear 222 secured to the frame of the machine and is adapted to be engaged by a finger 223 carried by the shaft 192. As the shaft is rotated in one direction, finger 223 engages the middle toe of the stop mechanism thereby moving it until the left hand toe thereof contacts with the frame of the machine and stops further rotation of the finger and shaft. Stoppage of rotation occurs at the position A which corresponds to the proper setting of the zeros on one series of number wheels. Rotation of the shaft in the opposite direction causes the opposite side of finger 223 to engage the opposite side of the middle toe of the stop mechanism, rotating the same until right hand toe engages the frame of the machine thereby again stopping the finger at position A, insuring that the zeros of the second set of number wheels will be properly positioned. An ordinary stationary stopping pin may not be used at 221 for the reason that, as such a pin would necessarily be of appreciable width, the shaft 192 would not stop in the same position when turned right-handedly as it would if turned left-handedly. The zeros on one set of number wheels would therefore be offset with respect to the zeros of the other set of number wheels.

The operation of the differential accumulator

As the arm 200 is rotated by movement of the pull wire thereof pawl 199 engages ratchet wheel 198 thereby causing ring gear 201 to be rotated in, for example, a counter-clockwise direction. Bevel gear 213 being held stationary, the pinions 203 cause bevel gear 204 to be rotated in the same direction, the number wheel 197 being carried along therewith by the friction created by means of spring washer 208. The relation of the movement of arm 200 with respect to the number wheel 197 is selected so that when the arm 200 is rotated through unit distance, the number wheel 197 rotates other unit distances, causing the next digit to appear. After number wheel 197 has rotated through 9 units corresponding to .9 of the periphery, upon the next unitary movement thereof a carry over is affected to gear 211 in the usual manner. Rotation of the gear 211 causes similar rotation of the gear 213 of the next higher order numeral wheel. As the ring gear 201 is held stationary by cooperating gear 196, this unitary movement is transmitted into like unitary movement of the next higher numeral wheel, but because of the reversing action of the bevel pinions 203, rotation of the next higher number wheel will be opposite to that of the first number wheel. Because of this reverse rotation numerals of these wheels must run in reverse order on successive wheels, as shown most clearly in Fig. 13.

Should a number be run in at the same time on two adjacent number wheels, one of which is necessarily of a different order than the other, carry over from one order to the other is entirely unaffected while at the same time individual indications are made on both wheels. This will be clear from a consideration of Fig. 14. Even if bevel gear 213 of the right hand number wheel unit happens to be turning a unit amount because of carry over from the left hand numeral wheel unit, the running in of numerals directly on the right hand number wheel by action of the right hand gear wheel 196 will be totally unaffected. The total movement of the right hand number wheel 197 will be dependent on two factors, the rotation of the bevel gear 213 forming one part of the differential and the rotation of the ring gear 201 forming another part of the differential, these rotations will be in their proper directions to create an additive movement of the right hand number wheel.

From this description it will be seen that the advantage of the differential accumulator in connection with our tabulating listing machine is that counting may be started from any number wheel at all and not necessarily from one number wheel having a fixed and invariable order with respect to the other wheels. Hence it is possible to set up on a single accumulator a plurality of different tabulations having numbers of lowest order at any desired position along the length of the accumulator. Likewise several tabulations may be made separated by any desired number of zeros.

In order to permit ready insertion of the matrix 62 in the holder thereof, an opening 224 is provided in the housing 28. This opening is closed by a suitable cover 225 which may be slid back and forth whenever necessary. The hand buttons 214 for resetting the accumulators are made accessible by another opening 226 in the housing.

After the slugs have traveled through the various tabulating and printing units they pass to the magazine units, of which any number may be of the sorting type such as unit 5 of Fig. 1 which is illustrated in more detail in Fig. 20.

This unit is provided with reading fingers and a matrix similarly to the printing and tabulating units already described. As these portions of the mechanism operate in the same manner in the sorting unit they are not shown in detail in Fig. 20. In the figure 300 indicates a bellcrank pivotally supported at 301 and having at 302 a presser foot which is pivotally mounted but held centered by a spring 303. The other arm 304 of the bellcrank is identical with arm 117 of the printing bellcrank already described, and cooperates with a similar operating mechanism. This mechanism comprises a cam 305 carried by shaft 23, with which the arm is held in engagement by means of a tension spring 306. The shaft 23 also carries a cam 307 which is positioned beside cam 305 and serves to operate a set of feeler fingers. A third cam 308 is positioned on the shaft and cooperates with an arm 309 connected to a matrix holder 310 which carries a matrix 311 properly positioned with respect to indicator fingers 312 of the feeler fingers. All of this mechanism just described will be recognized as similar to that of the units previously explained.

The arm 300 is provided with a locking pawl or dog 313 pivotally supported at 314 and having a holding spring 315 which is arranged to press against either of two flat faces 316, 317. This pawl is furnished with a latch projection 318 which is adapted to engage with a pin 319 on the arm 300 and thereby hold the arm in retracted position. For tripping the pawl and releasing arm 300 a drag link 320 having a lost motion connection 321 with the pawl is provided. This link connects at its other end with a bellcrank 322 rockably supported at 323 and having one end pivotally joined to the matrix holder 310 through a link 324. In operation, when the matrix holder is permitted to rise under the influence of spring 325, due to the holes in the matrix fitting the pattern of the finger 312, bellcrank 322 is rotated left handedly, thereby moving pawl 313 to the right out of engagement with the pin 319. Upon subsequent rotation of the cam 305 the tail 304 of arm 300 enters the dwell in the cam thereby rocking bellcrank 300 to the right and forcing presser foot 302 against the slug 326. Pressure on the slug bends resilient clips 327, forming the bottom of the trackway at that point, downwardly, far enough entirely to free the slug therefrom. The freed slug is pressed down into the magazine 328 where it engages on other slugs and thrusts them down slightly against a frictionally held supporting member 329 resting on a spring 330. Any other suitable magazine may of course be used.

The locking pawl 313 is reset by a pin 331 on the arm 304 in the same manner as the printing arm locking pawl.

In order to permit the slugs to be pressed downwardly into the magazine 328 the conveyor 8 is made just long enough to move an individual slug into position over the magazine opening. If the slug is not pressed down into the magazine it will be slid ahead in the trackway by the next slug pushed ahead by the conveyor. In this manner slugs rejected by unit 5 will move to unit 6.

Field of use

Since the machine is a combination listing and tabulating machine, it is in general adaptable to all those problems for which listing and/or tabulating machines are used. Because it performs the functions of both types of machines it is particularly adaptable to problems for which neither is wholly suited.

As a simple illustration, addressing machines are used for preparing lists for pay rolls. This machine will do this and in addition total the individual salaries to give the total monies required. This can be done on only one unit each week for weekly paid employees. At the end of each month two units could be used, one for the weekly employees and one for the monthly, and at one running both pay rolls could be made out.

The machine may, for another example, be used for printing the names of various employees having certain characteristics, and totalling their salaries as well if desired. In case it is desired to print the names of employees to which certain characteristics apply, and at the same time list the salaries of all of them having been employed in the company ten years, this may be done at one unit while at a subsequent unit in the machine the salaries of the entire group of employees, regardless of the period of their employment, may be tabulated, and all their names printed. If it is necessary to obtain any other information concerning this particular group, or to obtain a list of names of those out of the group of a particular nationality, color, or degree of education, this may be done at still another unit. As all of the units act on the slugs during one passage through the assembled machine, the time necessary for securing several different kinds of information is substantially no longer than the time required to obtain a single lot of information. The uses of the machine are not limited to personnel and salaries, however, as it is applicable as well to other matters such as sales, inventories, and all kinds of business records.

The slugs run through the machine may be sorted by the receiving magazine units, those having a particular group of characteristics being placed in one magazine and those of the other characteristics being placed in another magazine. This feature may for example be used in sorting out the address plates or slugs or those persons whose subscriptions to publications have expired, or in inventory work, to segregate the items which should be replenished at once, or within some given time.

The following table will indicate to a certain extent a kind of record which may be kept by the slugs. This particular table is made out in the field of personnel records rather than merchandise, sales, inventory or other records. Of course it will be understood that the various main and detail characteristics positions may be used to indicate any desired kind of data and that the personnel information contained in this table is merely for purpose of illustration. In the table the group of main characteristics corresponds to the vertical rows of projections on the slugs while the detail characteristics indicate the location of the projection in the row.

The operation of the machine is as follows: Suppose it is desirable to print the names of all weekly salaried married persons of the male sex having more than two dependents and earning between $40.00 and $90.00 a week, with the further requirement that the person be white, a citizen by birth, naturalization or marriage, and have a four-year American college education. Suppose also that no account is to be taken of the age, nationality, year employed or religion. The matrix is made up as shown in Fig. 18, the cross hatched places being cut out. This matrix is inserted in the holder 168 so that notch 227 of the matrix coincides with the key 180 of the matrix holder. It will be remembered that the position of the notch 227 determines the number of the unit in which the matrix is to be positioned and in this case the matrix may be notched to indicate unit number 1.

ber by the friction of the trackway 37. At position 39, during the return movement of the pushing pawls, the carriage 42 carrying the reading fingers or feelers 41, is thrust forward as a result of the moving of lever arm 50 to the left. This movement is caused by cam 55 carried by shaft 23, which is also driven by the motor 10. As the feelers move to the left, pin 46 is forced downwardly by the action of cam surface 56, thereby thrusting the feeling fingers down below the level of the top of the projections carried by the slugs 59. The feelers having been thrust down towards the face of the slug, during their advance movement engage with the projections on the slug and are thereby stopped at different positions depending on the locations of the projec-

DETAIL CHARACTERISTIC

| Pos. | Group Characteristics | 0 | 1 | 2 | 3 | 4 | 5 | 6 | 7 | 8 | 9 |
|---|---|---|---|---|---|---|---|---|---|---|---|
| 1 | Kind of record | Pay roll | Sales | Mdse. | Plant | Salary | | | | | (Other) |
| 2 | | In stock | Cash | Charge | | | | Weekly | Monthly | | (Other) |
| 3 | Sex | | | | | | | | | Female | Male |
| 4 | State | | | | | | Estranged | Widowed | Divorced | Married | Single |
| 5 | Dependents | 0 | 1 | 2 | 3 | 4 | 5 | 6 | 7 | 8 | 9 |
| 6 | Year of birth | | | | | | | | | | |
| 7 | | | | | | | | | | | |
| 8 | | | | | | | | | | | |
| 9 | Education | Not in U. S. A. | Grades only | High school incomplete | High school complete | College one year | College two years | College three years | College four years | Night school | Post graduate |
| 10 | | In U. S. A. | Foreign equivalents of the above 1-9 | | | | | | | | |
| 11 | Country of birth or nationality | Not of following | England | U. S. | Canada | Germany | France | Poland | Sweden | Norway | Denmark |
| 12 | | Not of following | Italy | Lithuania | Mexico | China | Japan | India | Russia | Greece | (Other) |
| 13 | Religion | Protestant | Catholic | Jewish | | | | | | | (Other) |
| 14 | Advancement | None | Slow | Fair | Rapid | | | | | | |
| 15 | Year employed | | | | | | | | | | |
| 16 | | | | | | | | | | | |
| 17 | | | | | | | | | | | |
| 18 | Civil state | Citizen by birth | Citizen by naturalization | First papers | Alien | Citizen by marriage | | | | | |
| 19 | Color | White | Black | Yellow | Brown | | | | | | |
| 20 | Salary | | | | | | | | | | |
| 21 | | | | | | | | | | | |
| 22 | | | | | | | | | | | |
| 23 | | | | | | | | | | | |
| 24 | | | | | | | | | | | |

Figure 19:
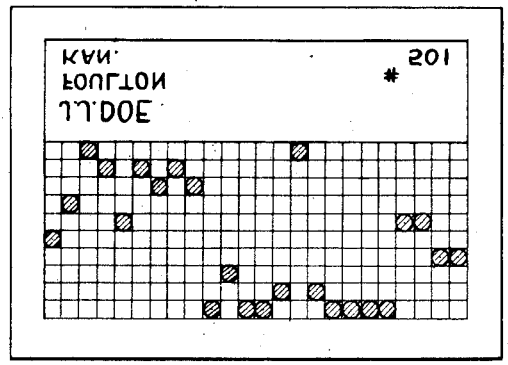

The side of the matrix is notched at 228 to indicate that the salary is to be tabulated. Other notches are provided at 230 and 231 corresponding to notches 108 and 93 shown on Fig. 6 to indicate respectively that the data on the accepted slugs only is to be tabulated and printed. With the matrix in place and the magazine 7 filled with slugs, the motor is started and lever 13 turned to engage clutch 12. Slugs are now fed one by one from the magazine 7 along the conveyor 8 to the position 39. This is accomplished by reciprocating channel member 31, carrying pusher pawls 33, through the agency of the drive gear 29 which is connected with the channel member by means of the connecting rod 30. The slugs are fed forward by the pushing action of pawls 33 and are held in the forward position during the return movement of the channel memtions. Each feeling finger travels along the line of a group characteristic or position on the slug and will be stopped after having traveled a distance dependent on the location of the detail characteristic of the projection in its path. For example, with a slug as indicated in Fig. 19, the fourth feeler finger from the left will be stopped at position 8 indicating that John Doe of Bradford, New Jersey, identification #501, is married. The other fingers will stop in various positions indicating that John Doe is on a weekly salary, male sex, has five dependents, was born in 1878, has a four-year college education, obtained in U. S. A., was born in the U. S. A. and has no other nationality, is a Protestant, has made slow advancement, was employed in 1910, is a citizen by birth, white, and draws a salary of $055.33.

The carriage 42 now having been advanced and all of the feeling fingers stopped in their proper locations, cam 67 reaches a position permitting push rod 66 to be drawn upwardly by its tension spring, thereby rotating the matrix holder arm 63 in a counter-clockwise direction thrust the matrix 62 towards the indicator fingers 65 carried by the feeler fingers 41. Assuming the matrix 62 to be the one shown in Fig. 18 we see that each of the fingers 65 will be positioned so as to enter one of the holes in the matrix indicated by the cross hatched portions. The slug of John Doe is therefore accepted and the matrix arm and matrix take the position shown in Fig. 3 of the drawings. Cam 67 having acted to raise the matrix holding arm towards the indicating finger 65, cam 77 has now reached such a position that cam rider 76 of push rod 75 has dropped into dwell 110 thereby permitting the push rod and arms 80 to move to the left under the influence of springs 83. This causes tie-rod 82 to move to the left thereby permitting bail 74 and levers 148 to move to the left. Movement of the bail 74 towards the matrix is permitted by notch 230 therein. Had the matrix not been accepted, the bail could not have moved to the left.

Those levers 148 corresponding to group characteristics 20 to 24 inclusive move freely into the notch 228 thereby withdrawing catching fingers 149 from locking teeth 150 of the indicator arms 138. The other levers 148 are blocked by striking the unnotched edge of the matrix 62 and prevented from moving to the left far enough to unlatch the catching fingers. The indicator arms 138 which are unlatched, are immediately rotated in a counter-clockwise direction by their springs 153 at a speed controlled by the counter-clockwise rotation of shaft 140 until one of the teeth of each serrated edge 139 engages the rear end of the corresponding feeler finger 41. The rotation of each indicator arm will therefore be dependent on the position of the end of the feeler arm, which in turn is dependent on the position of the projection on the slug with which the feeling finger has been engaged. The movement of the indicator arms therefore corresponds to the numerical value of the position of the feeler fingers, and the pull wires 136 are moved to a corresponding distance. The movement of the wires, through the action of rocker arm 134, causes a proper numerical indication to be made by the one of the accumulators 126, 127 or 128 to which the indicator arms are connected. This may be for example, accumulator 128, in which case the accumulator, having been previously set to zero, will now read 5533, the amount shown on the slug as the salary of John Doe.

Subsequent to the setting of the indicator arms, shaft 140 carrying key 142, which has been in a left hand position with respect to the lost motion slot 141 in the arms 138, is rocked in a right hand direction to reset the indicator arms. This is brought about by rotation of the cam 147 to such a position that cam rider 146 and push rod 144 are thrust upwardly thereby swinging arm 143 secured to shaft 140, in a right hand direction. As the indicator arms 138 are moved to their original position spring catches 149' of fingers 149 reengage the locking teeth 150 holding the indicator arms in place for another operation.

Left hand movement of arms 80 will rotate rocker arms 84 in a clockwise direction thereby withdrawing tie-rod 87 from engagement with feeler fingers 71, 72 and 73. These feeling fingers then move into engagement with the edge of the matrix. Finger 72 moves into the notch 231 in the edge of the matrix. This movement causes locking dog 95 to be released from pin 96, through the agency of drag link 94, and rotated to a right hand unlocked position where it is held by the action of spring 99 engaging with flattened face 100 of the dog. At the same time finger 73 moves towards the matrix, notch 102 engaging with the edge thereof, causing an indication to be set up on the accepted counter 158, through the action of the pull rod 103. The arms 80 remain to the left and levers 148 remain engaged in notch 228 during the whole time of counter-clockwise rotation of indicator arms 138 and are reset prior to their clockwise restoration. Prior to the restoration, the pull rod 75 was thrust to the right by action of its cam 77 thereby throwing the levers 148 and feeling fingers 71, 72 and 73 back to normal position.

At the instant when the carriage 42 had been moved to its extreme left hand position by the lever arm 50, pin 46 moved beyond the end of member 57 thereby permitting the carriage to rise vertically a sufficient distance to allow the feeler fingers 41 to clear the top of the projections of the slugs. Upon movement of rod 75 to the left and the actuation of the tabulating mechanism and printing lock, further rotation of the driving motor 10 causes the slugs to be stepped forward to another position. Continued rotation of the shaft 23 causes the depression 191 to come under the tail 117 of bellcrank 97 and the bellcrank is thereupon rotated rapidly in a clockwise direction under the influence of spring 121 bringing the printing head 98 down so as to press the paper 120 against the upper side of the slug or typewriter ribbon positioned there over, to cause printing. The upper side of the slug, as we will see by Fig. 17, carries certain information in raised letters or type so as to be printed in a readable manner on the paper. In the case of the slug shown in Fig. 19 the printed matter is John Doe
      Foulton
      Kan.      #501

At the instant when the printing head 98 is about to contact with the paper 120, the tail 117 of the bellcrank 97 strikes rubber bumper 122, deformation of which causes the bellcrank to rebound, thereby throwing the printing head free from the paper and permitting free movement of the slugs. Upon the printing movement of the bellcrank 97, gear 185 of the paper feed mechanism was rotated counter-clockwise by gear sector 190 thereby causing the ratchet pawl 188 to slip over the teeth of ratchet wheel 189. Return movement of the bellcrank 97 therefore causes a reverse motion of pawl 188 which thereupon turns ratchet wheel 189 and the paper feed rollers, so that the paper is fed ahead another position.

Further rotation of the shaft 23 brings the rise 123 of the cam 118 into engagement with the tail 117 of the bellcrank 97 thereby restoring it to its normal position, as indicated in Fig. 2. At the end of the printing stroke of bellcrank 97 tail 117 thereof struck the locking dog 95 sufficiently to move it against the action of spring 99, to the left, so that flattened face 125 engages with the flat face of the spring, thereby holding the dog in such position that upon return movement of bellcrank 97 to locking position, pin 96 is moved into locking position with respect to the dog 95.

Subsequently to the resetting of bellcrank 97 cam rider 54 of lever 50 moves into the depression of cam 55 thereby permitting the lever 50 to move in a right hand direction under the influence of its spring. This movement carries the carriage 42 to the right thrusting the rear ends of the feeling fingers 41 against the hubs of indicator arms 138 which serve as stops thereby holding the fingers in a fixed position during the remaining portion of the movement of the carriage. Upon completion of the movement of lever 50, the fingers 41 will be fully reset and the entire mechanism ready for another cycle of operation. As the carriage 42 travels to the right on its resetting movement, projection 113 of member 114 carried thereby engages with projection 115 carried by the frame of the machine thereby causing the carriage to be depressed slightly. This depression of the carriage permits the member 57, which was being carried in a right hand direction against spring 58 by thrusting movement of square corner 112 of pin 46, to snap back to the left hand position shown in Figs. 2 and 3.

After the slugs have been fed through the various units 2, 3 and 4 of the machine, wherein they may be acted upon in a similar fashion as in the unit just described, but for the purpose of obtaining different information, they move to a unit 5. At this unit the slugs may be separated into two groups. Those of one group are forced down into the magazine 328 of the unit while the rest are fed forward to unit 6 and are there thrust down into magazine 9 by the action of pusher plate 14 which is oscillated at the proper instant of time by shaft 16 coupled to shaft 23 and forming a continuation thereof.

The selecting action of unit 5 is determined by a matrix 311 carried thereby. A set of feeler fingers, not shown, similar to those of the tabulating units described move, at the proper time, into engagement with the projections on the slug, whereupon matrix holder 310 rises testing indiacting fingers 312 with matrix 311. If the pattern of the fingers fits the matrix the latter will rise, thereby moving pawl 313 to the right, through the agency of link 324 bellcrank 322 and drag link 320. This action unlocks the bellcrank 300 which, after the next step of conveyor 8, is permitted by its controlling cam 305, to rotate clockwise fashion and force the presser plate 302 against the slug 326 thereunder. By this action the slug is thrust out of its trackway, springing out of its path resilient fingers 327, and into the magazine 328. Clockwise movement of the bellcrank 300 causes pin 332 to strike pawl 313 and snap it back to its normal holding position, similarly to pawl 95, so that upon the following restoring movement of the bellcrank the pawl engages with pin 319 and is locked thereby.

Slugs that are not accepted by unit 5 are pushed ahead step by step by following slugs until they arrive under presser foot 14 which thrusts them into magazine 9.

No tabulating mechanism has been shown but this might obviously be used in exactly the same manner as in units 2, 3 and 4. Likewise unit 5 might be provided with testing fingers for controlling tabulation just as in the units above described. The bellcrank 300 might also be controlled in the same manner as the printing bellcrank 97, of those units.

The slug shown in Fig. 19 serves merely to illustrate a particular slug that might be accepted by the matrix 16. But it will be understood that many other slugs differing from that shown in Fig. 19 may be accepted as well. For example, regardless of the location of the projection of the slug in group characteristic position 7, 8, 11, 12, 13, 14, 16, 17, 22, 23 or 24 the slug may be accepted depending on the position of the projections representing the other characteristics. Also the matrix accepts slugs regardless of the location of the projection in position 21 between detail position 4 to 8 inclusive. Similarly it accepts slugs with projection in either 0, 1 or 4 detail position of general position 18; and in general position 5 the projection may be anywhere from 3 to 9 and the slug still be accepted, etc. Each of the twenty-four positions of the matrix must be provided with one or more perforations regardless of whether information is desired of that point or not. If no information is desired all ten detail positions will be perforated. There must be one projection only in each of the twenty-four positions of each slug. For example the twentieth position of John Doe's card reads 0 which means that his salary is less than $100.00 per week.

By reference to the chart given above it will be seen that where one common group of detail characteristics occupies more than one row corresponding to group characteristics it is necessary to place on any slug or matrix a projector indicating that the true reading is not in that column but in the other. For example, if Joe Doe was an Italian detail position 0 of group characteristic 11 would have a projection indicating that the nationality of Joe Doe was not to be found under that group characteristic. Detail position 1 of group characteristic 12 would have a projection to show Doe's nationality.

As shown in the table, specifically, group characteristics 1 and 2 with certain data, the genus may be indicated in one group position and the species in another group position. Referring to the table we will find that group position 1, detail position 1, group position 2, detail position 6 means "weekly sales" while group position 1, detail position 1 and group position 2, detail position 7 means "monthly sales". This arrangement is useful in certain circumstances where a particular class of information would ordinarily take up two or more group positions as more information can be concentrated in a small space. No indication is needed that the information is "not of the following", that is, not in that group characteristic.

The operation of a single unit has been explained in detail when utilizing a matrix such as shown in Fig. 18. The other units of the machine may be provided with matrices different from that shown in Fig. 18. The matrix shown in Fig. 18 may be utilized for determining the average salary of all men answering the conditions thereon perforated merely by dividing the total indication of counter 158 into that of counter 128. Possibly it might be desired also to obtain a list of all men having the same general characteristics as indicated by the matrix shown in Fig. 18, but drawing exactly $50 a week. In this case perforations should be made in the matrix the 20th, 21st, 22nd, 23rd and 24th group characteristic positions so as to indicate an individual characteristic 05000. If furnished with such a matrix the unit would select only men earning $50 a week and having the other characteristics enumerated by the matrix.

What we claim is:

1. In a listing machine, means for feeding slugs to a testing position, feeling members, means for yieldingly advancing at said position said feeling members in one dimension to register with indicia on said slugs to store an indication, means for moving in another dimension the ends of said feeling members out of contact with said slugs to free the slugs for travel and still maintain the indication stored by the advancing of said members, and means for thereafter restoring the feeling members to normal position.

2. In a listing machine, means for feeding slugs endwise to a testing position, testing means at said position for advancing into contact with each slug to set up an indication by the displacement of the testing means, means for disengaging said testing means while retaining said testing means in its position displaying said indication and means for thereafter restoring said testing means to normal position.

3. In a listing and tabulating machine, means for feeding slugs having numerical data, by steps to a testing position, a plurality of feeling fingers at said position, means for advancing said fingers into contact with said slugs to set up and retain a numerical indication, means for instantly freeing the fingers from the slugs while said fingers are retained in their advanced position, tabulating means associated with said fingers for recording the indication and selecting means for determining whether or not to record the indication.

4. In a listing machine, means for feeding slugs by steps to a testing position, a plurality of feeling fingers at said position and means for advancing said fingers across the face of each slug and parallel with the slug to set up an indication, and means operative thereupon instantly to move said fingers away from said slug in a direction normal to the surface thereof.

5. In a listing machine, means for feeding slugs indicating numerical data, means for reading said data, a matrix standard, a counter, means for comparing a slug with the standard, means responsive to compliance of the slug with the standard for causing said counter to record numerical data indicated by the slug and means controlled by the standard for determining which parts of the data shall be recorded.

6. A device in accordance with claim 5 wherein the means controlled by the standard comprises a series of levers adapted to move in a certain direction to record data, and the standard is fashioned to prevent movement of certain of said levers.

7. A device in accordance with claim 5 wherein the counter has a series of numerical indicating positions and means associated with the matrix standard to render certain of said positions inactive.

8. In a listing machine, a counter having a series of indicating positions means determined by indicia on slugs to move said counter into certain positions, and a master record bearing control indicia of said positions inactive.

9. In a tabulating listing machine, means for feeding record members bearing data, record member feelers registering numerical data borne by said record members, a standard record, means for comparing said record member feelers with the standard, counting means for tabulating from said record member feelers numerical data thereby registered, and means responsive to accordance of said record member feelers with the standard for causing said counting means to tabulate.

10. In a tabulating machine, record members, a selecting station, means to feed said record members seriatim to said station, data feelers at said station registering temporarily data from a record member, a standard desiderata record, means for comparing said data feelers with said standard record, and counting means for tabulating numerical data from a group of said data feelers.

11. A tabulating machine, record members bearing positionally recorded data, a selecting station, means to feed said record members seriatim to said station, data feelers at said station registering temporarily data from a record member fed to said station, a standard desirata record, means for comparing said data feelers with said standard record to determine action as to each record member, counting means for tabulating numerical data from a group of said same data feelers and controlled by said means for comparing, and indicia on said standard desiderata record controlling from what group of data feelers said counting means may tabulate.

12. A tabulating machine in accordance with claim 11 and comprising record member counters and sorting means, both actuated in accordance with the operation of said means for comparing.

13. In a tabulating machine, means for reading numerical data from record members, an accumulator having, for alternate decimal positions, digid registering wheels numbered in opposite sense, and a differential gear connection between one decimal position wheel and the next.

14. In a tabulating machine, means for reading numerical data from record members, digit registers for each decimal order, an adding device for each of a group of said digit registers, said adding device comprising a differential gear drive for moving its own digit register, said drive being controlled by said means for reading, and carry means including the differential gear drive of said adding device for imparting motion to another digit register of higher order in addition to and simultaneously with any motion imparted by its own adding device to said higher order digit register.

15. In a tabulating machine, means for reading numerical data from records, digit registers for several contiguous decimal orders, an adding device controlled by said means for reading to register a digit in one of said digid registers, a carry device to register a digit as a carry from one digit register to the next higher, and a differential gear train included both in said adding device and in said carry device.

16. In a listing tabulator, a supply of records, means to feed records from said supply, a set of record feelers to feel records, a master record, a group of indicia on said master record, selector means to compare said group of indicia with said record feelers for each record felt, listing means under the control of said selector means, a tabulating bank under the control of said selector means to accumulate data from said record feelers, and means on said master record to determine from which record feelers said bank may accumulate.

17. In a tabulating machine, record members, positional indicia thereon recording certain information, reproducible legents on said record members recording certain other information, means to feed said record members from one position to another position, a matrix constituting a standard record, means to compare said indicia on one of said record members with said matrix, means to take off that part of the information recorded by positional indicia on a record member at one position, and means to take off that part of the information recorded by reproducible legends on said last-mentioned record member at another position, both said means to take off being controlled by said means to compare.

18. A record classifying and data lifting system comprising record members, indicia thereon recording data, a data lifting mechanism comprising a variable number of data lifting units connectible as desired in juxtaposition, each of said data lifting units comprising a feed means for record members, an indicia reading means, a matrix constituting a master record member to record and control the classification of desirable data for its own particular unit to lift, a means to compare said indicia on each record member presented by said feed means with said matrix, and means to lift data from said record members under the control of said means to compare whereby as many distinct categories of data can be lifted from one lot of record members at one running as there are juxtaposedly connected units in said data lifting machine.

19. In a record comparing, classifying and compiling system, a store of record members bearing reproducible inscriptions and also positionally recorded information, an information compiling machine comprising a record member supply magazine unit, and a plurality of handling units for selectively gathering information from record members passing therethrough, means operatively to connect in juxtaposition said magazine unit and a series of said handling units, and means to feed record members from said supply magazine unit through a juxtaposedly connected series of said handling units, said last mentioned means including feed means forming part of each of said handling units, and a matrix controlled selector in each handling unit.

20. In a record comparing, classifying and compiling system, a store of record members, indicia on said record members recording information of many kinds to be classified and compiled, an information gathering machine for taking off from record members out of said store information of several desired classifications at one running, said information gathering machine comprising a record member supply mechanism unit and a variable number of selecting units juxtaposedly connectible in series as desired to operate as one machine, in each selecting unit means to lift data according to one desired classification including a matrix, a record member reading device and a means for comparing said matrix and said record member reading device, said system comprising in one of said selecting units a compiling and tabulating device and in another of said selecting units a classifying magazining device, each of said two last mentioned devices being controlled by said means for comparing in its own unit.

PAUL M. RAINEY.
ARTHUR H. ADAMS.